United States Patent [19]

Vincent

[11] Patent Number: 5,014,911
[45] Date of Patent: May 14, 1991

[54] HEATING AND/OR AIR CONDITIONING APPARATUS FOR AN AUTOMOTIVE VEHICLE

[75] Inventor: Philippe Vincent, Epernon, France

[73] Assignee: Valeo, Paris, France

[21] Appl. No.: 315,144

[22] Filed: Feb. 24, 1989

[30] Foreign Application Priority Data

Feb. 26, 1988 [FR] France .............................. 88 02347

[51] Int. Cl.⁵ ...................... F25B 29/00; B60H 1/04
[52] U.S. Cl. ........................ 237/12.3 B; 237/12.3 A;
           165/42; 165/43; 98/2.08; 98/2.09; 98/2.11
[58] Field of Search ................ 168/42; 165/43, 103,
           165/100; 237/12.3 A, 12.3 B, 5; 98/2.08, 2.09,
           2.06

[56] References Cited

U.S. PATENT DOCUMENTS

| | | | |
|---|---|---|---|
| 3,174,538 | 3/1965 | Nallinger | 98/2.06 |
| 3,807,631 | 4/1974 | Mohr | 165/103 |
| 4,108,376 | 8/1978 | Matsuda et al. | 237/12.3 B |
| 4,289,195 | 9/1981 | Bellot et al. | 165/42 |
| 4,383,642 | 5/1983 | Sumikawa et al. | 237/12.3 A |
| 4,406,214 | 9/1983 | Sakurai | 98/2.08 |
| 4,440,212 | 4/1984 | Tanino et al. | 98/2.08 |
| 4,519,302 | 5/1985 | Nilsson et al. | 98/2.06 |
| 4,531,671 | 7/1985 | Schwenk | 237/12.3 B |
| 4,549,692 | 10/1985 | Busch et al. | 237/12.3 A |
| 4,821,792 | 4/1989 | Bednarek | 237/12.3 B |
| 4,828,018 | 5/1989 | Hoffman | 165/42 |

FOREIGN PATENT DOCUMENTS

| | | |
|---|---|---|
| 0102611 | 3/1984 | European Pat. Off. . |
| 0246948 | 11/1987 | European Pat. Off. . |
| 1262807 | 3/1968 | Fed. Rep. of Germany . |
| 3338768 | 5/1985 | Fed. Rep. of Germany . |
| 3510991 | 10/1986 | Fed. Rep. of Germany .......... 237/5 |
| 2562845 | 10/1985 | France . |
| 2608520 | 6/1988 | France .................... 237/5 |

OTHER PUBLICATIONS

Patent Abstracts of Japan, vol. 9, No. 294, Nov. 20, 1985, JP A 60-131,312.
Patent Abstracts of Japan, vol. 11, No. 269, Sep. 2, 1987, JP A 62-71,717.

*Primary Examiner*—John K. Ford
*Attorney, Agent, or Firm*—Dennison, Meserole, Pollack & Scheiner

[57] ABSTRACT

A heating and/or air conditioning apparatus for an automotive vehicle includes an inlet duct for supplying ambient air from outside the vehicle and dividing into a first branch and a second branch. A heat exchanger is mounted in the second branch, and the first and second branches communicate with each other through a junction, at which a control means is situated. The latter enables the temperature of the air leaving the outlets from the apparatus to be varied. A flap valve with two flaps, pivoting about an axis, is arranged in the said junction close to that edge of the junction which is nearest to the heat exchanger.

10 Claims, 2 Drawing Sheets

HEATING AND/OR AIR CONDITIONING APPARATUS FOR AN AUTOMOTIVE VEHICLE

FIELD OF THE INVENTION

This invention relates to a heating and/or air conditioning apparatus for an automotive vehicle.

BACKGROUND OF THE INVENTION

Conventionally, a heating and/or air conditioning apparatus for an automotive vehicle includes an air supply duct for delivering external air, i.e. ambient air from outside the vehicle, with this duct dividing into a first branch and a second branch, the first branch having first outlet means into the interior of the vehicle, the second branch comprising a heat exchanger for heating air passing through it, the second branch having second outlet means for delivery of air into the interior of the vehicle, the apparatus further comprising junction means for bringing the first and second branches into communication with each other and control means for adjusting the temperature of the air delivered from the various said outlet means.

The means for regulating the temperature of the air delivered via the outlets may for example be a valve, and is so arranged that this air may be delivered at the same temperature through the first and second outlets, or with the air from the first outlets being at a different temperature from that at the second outlets. In this latter case, the apparatus can function in a "bi-level" manner, in which the temperature levels are stratified in such a way as to cause the temperature to be different as between the first and second branches.

It has however been established that such an arrangement has some disadvantages. In the embodiments known at the present time, the different air outlets include flap valves in the vicinity of their outlets, allowing the flow of air delivered to be regulated. When for example the flap valves of the outlets of the first branch are closed, there is a back flow of air into the junction region, and this back flow mixes with treated air inside the apparatus, so disturbing the temperature of the latter.

SUMMARY OF THE INVENTION

It is an object of the present invention to avoid this major disadvantage.

Another object of the invention is to provide a simple and compact heating apparatus.

To these ends, according to the invention, there is provided a heating and/or air conditioning apparatus for an automotive vehicle, comprising a supply duct for supplying external air, with the supply duct being divided into a first branch and a second branch, the first branch having first outlet means into the interior of the vehicle, the second branch comprising a heat exchanger for heating air passing through it, the second branch having second outlet means for delivery of air into the interior of the vehicle, the apparatus further comprising junction means for bringing the first and second branches into communication with each other and control means for adjusting the temperature of the air delivered from the various said outlet means, the apparatus further comprising a flap valve, having two flaps and pivotable about an axis disposed transversely to the general direction of air flow, the flap valve being situated in the said junction close to that terminal edge of the said junction which is nearest to the heat exchanger.

Preferably, in one extreme position, the flap valve 17 blocks the said junction while allowing free flow through the said first branch, and vice versa. This arrangement prevents air from the first branch flowing backwards into the outlet portion of the second branch.

According to another feature of the invention, one flap of the said flap valve is arranged so that it can act as a mask for the heat exchanger. In this case the temperature of the air at the outlet of the second branch has two temperature levels.

According to a further feature of the invention, the flaps of the flap valve are arranged to act as deflectors. These deflectors allow the division or mixing of the various air streams to be improved.

The other features and advantages of the invention will become more apparent from the description which follows, and which is given with reference to the accompanying drawings.

DESCRIPTION OF PREFERRED EMBODIMENTS

Figures 1, 2:
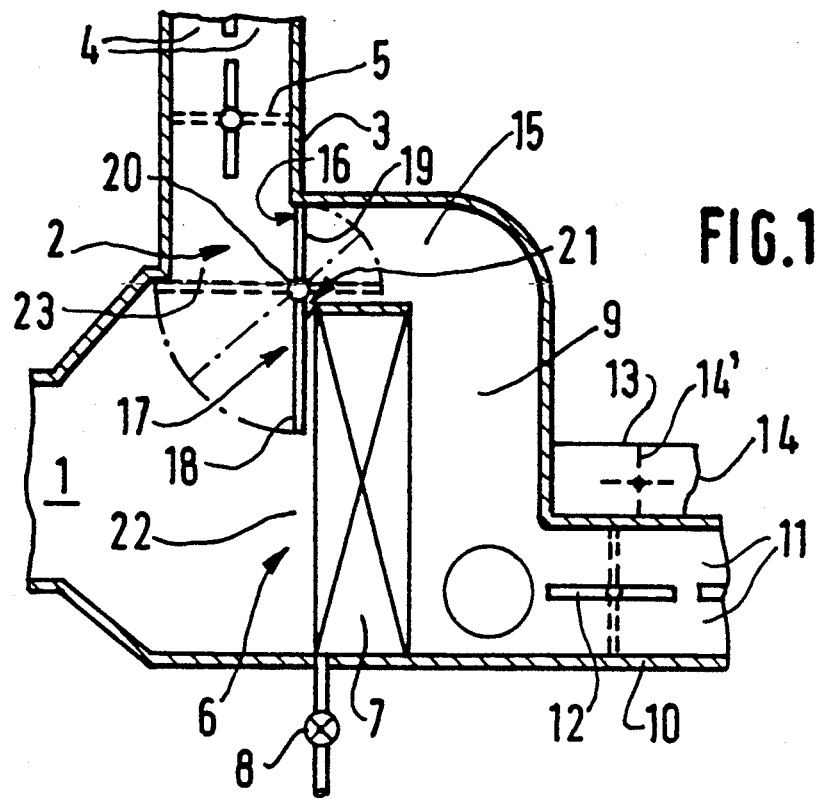
FIG. 1 is a diagrammatic view of the apparatus for heating and/or air conditioning according to the invention.
FIG. 2 is a diagrammatic view showing a modification of the apparatus according to the invention.

Reference is first made to FIG. 1. The apparatus for heating and/or air conditioning shown in this Figure includes a duct 1 for the supply of external air, which may be air that has been treated by passing through an evaporator which forms part of an air conditioning circuit. The duct 1 divides into a first branch 2 exhausting into the passenger compartment of the vehicle through a first duct 3. This is provided with a plurality of first outlets 4 located at floor level. Opening and closing of these outlets is controlled by a flap valve 5.

The air supply duct 1 also has a second branch 6 which includes a heat exchanger 7. A fluid circulating in the latter may be controlled by a control means such as a valve 8. The outlet portion 9 of the branch 6, that is to say the portion of the latter situated downstream of the heat exchanger 7 in the direction of flow of the air, is itself split into a second duct 10 and a third duct 13. The second duct 10 leads towards second outlets 11, which are controllable by a flap valve 12 and which may for example be directed into the lower part of the passenger compartment. The third duct 13 leads towards a third set of outlets 14, controlled by a flap valve 14' and directed, for example, towards the windscreen of the vehicle for deicing of the latter or removal of condensation.

The outlet portion 9 divides not only into the ducts 10 and 13, but also into a short branch 15, extending around the heat exchanger 7 as seen in FIG. 1 and joining the branch 2 at a junction 16. In this example the junction 16 is situated upstream of the heat exchanger 7, and brings the outlet portion 9 of the branch 6 into communication with the first duct 3 of the branch 2, while also providing a mixing zone, as will be seen.

A flap valve 17, having two flaps 18 and 19 pivotting about an axis 20, generally transverse to the direction of air flow, is arranged in this junction 16.

As can be seen more clearly from the Figure, the axis 20 of the flap valve 17 is situated at the junction 16, and more particularly at the terminal edge 21 of the junction which is nearest to the heat exchanger 7.

The apparatus shown in FIG. 1 operates in the following manner.

The occupant of the vehicle controls the temperature in the passenger compartment to a desired value using the control means, in this example the valve 8, which regulates the flow of heat exchange fluid through the heat exchanger 7.

In the case where fresh air is required in the passenger compartment, that is to say where the air delivered via the outlets 4, 11 and 14 is fresh air, the valve 8 is closed, and the flap valve 17 is preferably in the position shown in full lines in the Figure.

In this position, the flap 19 of the valve 17 blocks the junction 16, while the flap 18 masks part of the inlet 22 of the branch 6. The inlet 22 is, in this example, the upstream face of the heat exchanger 7.

Fresh air arriving through the duct 1 divides into a first air stream passing through the heat exchanger 7, and another air stream which impinges on the flap 18. The temperature of the first air stream remains substantially unchanged, this stream being directed from the heat exchanger 7 into the ducts 10 and 13, and also into the branch 15 (although the latter is of course blocked by the flap 18). The flap 18 acts as a deflector for the second air stream, which is thus deflected into the inlet 23 of the branch 2.

With this arrangement, and in particular with the flap 18 of the flap valve 17 partly masking the heat exchanger, the air flow in the branch 2 can be made substantially identical with that in the branch 6, by suitable adjustment of the position of the flap 18.

When warm air is required in the passenger compartment of the vehicle, the heat exchanger valve 8 is opened, and the flap valve 17 is in the position shown in broken lines in FIG. 1, in which it blocks the inlet 23 of the branch 2 while leaving the junction 16 between the branches 15 and 2 free. Fresh air arriving through the duct 1 passes through the heat exchanger 7, in which it is heated. It then passes to the outlet portion 9 of the branch 6 and splits into two air streams, one of which is directed into the ducts 10 and 13 while the other passes through the branch 15 and thence into the duct 3 via the open junction 16, so admitting warm air into the duct 3.

If the occupant of the vehicle requires fresh air to be delivered from the first branch 2 via the air outlets 4, but also requires warm air from the second branch 6, the heat exchanger valve 8 is opened and the flap valve 17 is put into the position shown in full lines. Fresh air arriving through the supply duct 1 then divides into a first air stream passing through the heat exchanger 7 and a second air stream directed towards the branch 2. The air stream passing through the heat exchanger is there heated, and is then directed towards the ducts 10 and 13 and towards the branch 15, the latter being once again blocked by the flap 19 of the valve 17. The other air stream passes through the branch 2 in the same way as described above for the case where fresh air was admitted directly.

Here, fresh air can be delivered via the first outlets 4 while heated air is delivered by the outlets 11 and 14.

Should the occupant want to have a very small quantity of fresh air delivered via the outlets 4, he adjusts the flap valve 5 in such a way as to restrict the air flow through the outlets 4. In this case, the air stream passing through the branch 2 tends to flow backwards towards the inlet 23 of that branch. Since the junction 16 is blocked, this back flow of air has no option but to pass through the heat exchanger 7.

If the temperature required at the outlets 4 is higher than the ambient air temperature outside the vehicle, but less than the temperature of the air heated by passing through the heat exchanger 7 under the control of the valve 8, the occupant adjusts the flap valve 17 into an intermediate position, for example that shown in phantom lines in FIG. 1. In this case, the flow of fresh air arriving via the duct 1 divides into a first air stream deflected by the flap 18 of the valve 17, so as to pass into the branch 2; and a second air stream which passes directly through the heat exchanger, in which it is heated. This heated air has two levels of temperature in the outlet portion 9, namely a first level which obtains in the lower part of the passenger compartment of the vehicle, and a second level resulting from the action of the flap 18 of the valve 17. In its intermediate position, the valve 17 has the effect of reducing the flow of the air downstream of its surface. This reduced flow passes through the adjacent portion of the heat exchanger and is heated to a temperature different from that to which the remainder of the air, unaffected by the flap 18, is heated.

The air that is heated to a first level of temperature tends to pass into the ducts 10 and 13, while the air at the second temperature level tends to pass into the branch 15 and thence into the duct 3, via the junction 16 which is partly obstructed by the flap 19 of the valve 17. In the mixing zone at the junction 16, this air at the second temperature level mixes with the fresh air which is also present in the mixing zone, so that the air delivered by the outlets 4 consists of this mixture. In this way, the temperature of the air delivered by the outlets 4 can be regulated by the combined action of the flaps 18 and 19 of the valve 17, while the flap 19 forms a partial obstruction to the backward flow of any air from the duct 3.

Referring now to FIG. 2, this shows a modified embodiment of the heating and/or air conditioning apparatus. In FIG. 2, the branch 15 is provided with a flap valve 25 which allows the volume of air admitted towards the junction 16 to be controlled, and which consequently allows the temperature of the air leaving the outlets 4 to be varied.

The valve 25 may be coupled with the flap valve 17, in such a way that, in the extreme, i.e. fully open and fully closed, positions of the valve 17, the valve 25 is also in the corresponding position, while in the intermediate positions of the valve 17 the valve 25 can be in corresponding intermediate positions which may be identical to, or different from, those of the valve 17. For example, the valve 17 may be in a closed position when the valve 25 is in control of the outlets 4, and this has the effect of preventing backward flow of air from the branch 2 into the outlet portion 9 of the branch 6.

Figure 3:
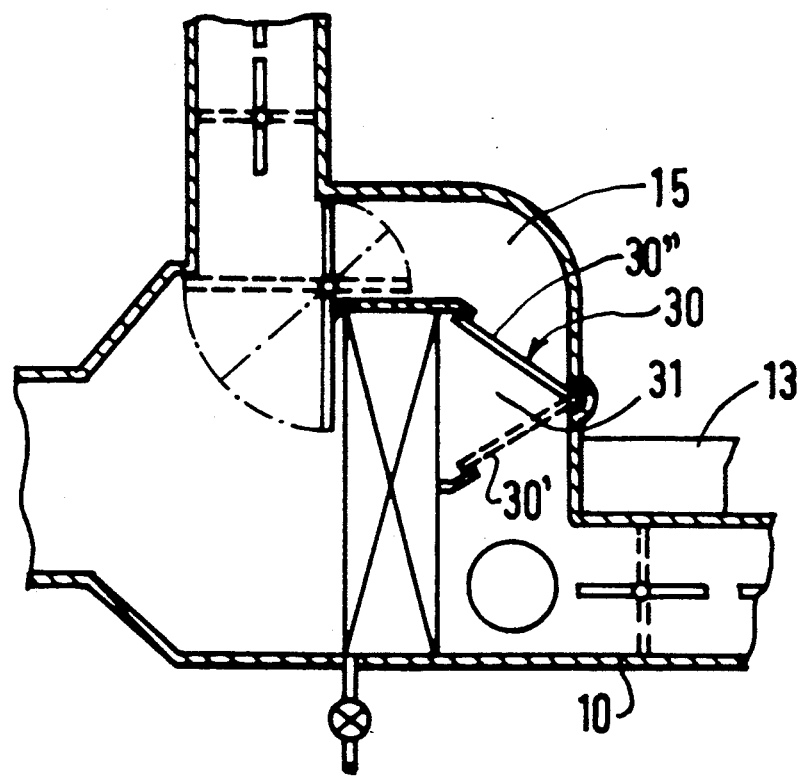
FIG. 3 is a diagrammatic view showing a further embodiment of the apparatus according to the invention.

FIG. 3 shows another modified arrangement, in which a flap valve 30 is situated in the branch 15. In one of the extreme positions, 30', of the valve 30, the latter defines a duct portion 31 in communication with the branch 15. In its other extreme position, 30″, the valve 30 brings the duct portion 31 into communication with the ducts 10 and 13. The valve 30 can be arranged to assume the same positions as described above for the valve 25 in FIG. 2.

Figure 4:
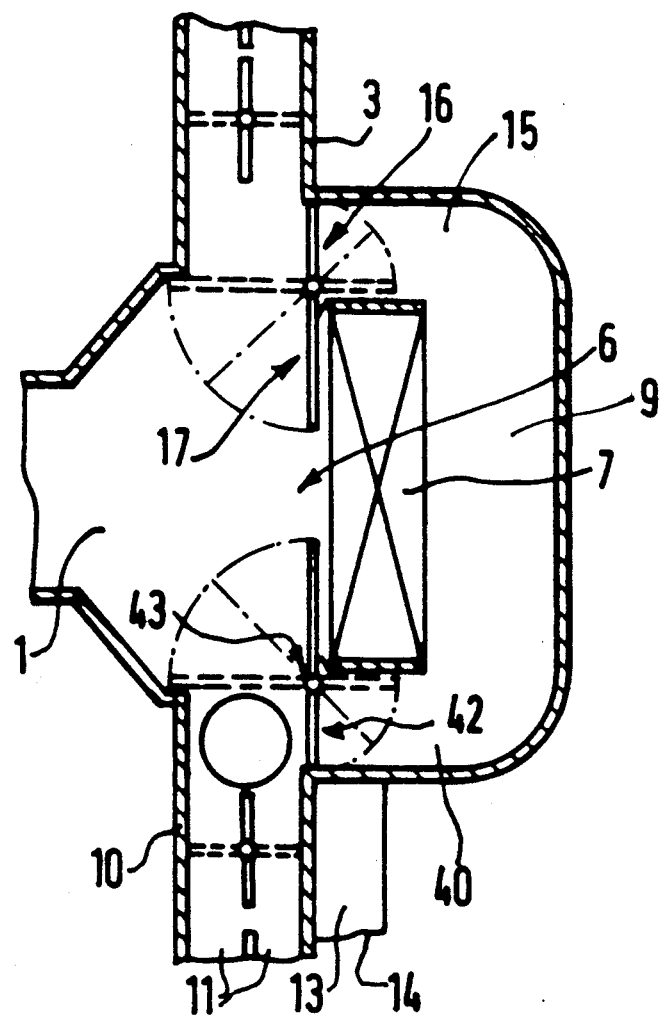
FIG. 4 is a diagrammatic view showing yet another embodiment of the apparatus according to the invention.

In the modified arrangement shown in FIG. 4, the heating and/or air conditioning device includes a heat exchanger 7 which is not provided with any means for regulating the flow of the heat exchange fluid circulating in it. Instead, control of the action of the heat exchanger is provided for as follows. The ducts 10 and 13 are connected directly to the outlet portion 9 of the branch 6, and to a branch 40 which extends around the heat exchanger 7 in the same way as does the branch 15 in all of FIGS. 1 to 4.

The branch 40 is in communication with the ducts 10 and 13 via a junction 42, in which is located a flap valve 43, similar to the flap valve 17 and mounted in the same way. It will be seen that the outlet portion of the branch 6 can only exhaust into the branches 15 and 40, and these can be blocked by the valves 17 and 43. The apparatus shown in FIG. 4 operates in an identical way to that shown in FIG. 1, except in respect of the way in which the temperature of the air for heating the passenger compartment is regulated. This is effected by means of the valve 43, which can be adjusted between its two extreme positions shown in FIG. 4. Thus, when the valve 43 is in the closed position shown in full lines in FIG. 4, the air passing into the passenger compartment through the ducts 10 and 13 is fresh air, while the air passing through the duct 3 may be hot or cold or mixed, depending on the position to which the valve 17 is set. When the valve 43 is in its fully open position shown in broken lines in FIG. 4, the air in the ducts 10 and 13 is hot air, while that in the duct 3 can be hot or cold or mixed, again depending on the setting of the valve 17.

The intermediate positions of the valve 43 allow the temperature of the air admitted into the ducts 10 and 13 to be regulated by mixing the hot air circulating in the branch 40 with that of the cold air delivered via the air supply duct 1. In this last mentioned position, the air temperature in the duct 3, regulated by the valve 17, is independent of the air temperature in the ducts 10 and 13.

The invention may be applied to an air conditioning apparatus, as mentioned above, in which an evaporator, for cooling the external air, is located in the duct 1 upstream of the heat exchanger 7.

What is claimed is:

1. Air temperature regulating apparatus for an automotive vehicle, comprising a supply duct for supplying external air, said supply duct being divided into a first branch and a second branch, said first branch having first outlet means into the interior of the vehicle, said second branch comprising a heat exchanger for heating air passing through it, said second branch having a second outlet means for delivery of air into the interior of the vehicle, the apparatus further comprising junction means for communicating said first and second branches with each other, said junction means having a terminal edge proximal said heat exchanger and extending therefrom, and control means for adjusting the temperature of the air delivered from said first and second outlet means comprising a flap valve having two flaps joined for simultaneously movement and pivotable about an axis disposed transversely to the general direction of air flow said flap valve being situated in the said junction means and adjacent said terminal edge, said flap valve pivoting between one extreme position closing said junction means and partially masking the heat exchanger while allowing free flow of air through the said first branch, and a second extreme position closing said first branch while allowing free flow of air through said heat exchanger and junction means.

2. Apparatus according to claim 1, wherein said flaps of said flap valve are so disposed as to act as deflectors.

3. Apparatus according to claim 1, wherein said junction means is situated upstream of the heat exchanger.

4. Apparatus according to claim 1, wherein said junction means is connected to the second branch through a further branch.

5. Apparatus according to claim 4, wherein said further branch contains a further flap valve.

6. Apparatus according to claim 1, including means associated with the heat exchanger for controlling the flow of a heat exchange fluid therethrough.

7. Apparatus according to claim 1, wherein the outlet means includes outlets connected to the air supply duct through further ducts connected with an outlet portion of the said second branch through a further branch defining a further junction means.

8. Apparatus according to claim 7, wherein said further junction means contains a flap valve substantially identical with the first mentioned said flap valve.

9. Apparatus according to claim 1 wherein the partial masking of said heat exchanger is effected by one of said flaps of said flap valve, the closing of said junction means being effected by the other flap of said flap valve simultaneously with the partial masking whereby flow through said first and second branches is maintained without communication between said first and second branches and with flow through said second branch being partially obstructed by said partial masking.

10. Apparatus according to claim 9 wherein said junction means is situated upstream of the heat exchanger.

* * * * *